United States Patent [19]

Doany et al.

[11] Patent Number: 5,621,486
[45] Date of Patent: Apr. 15, 1997

[54] EFFICIENT OPTICAL SYSTEM FOR A HIGH RESOLUTION PROJECTION DISPLAY EMPLOYING REFLECTION LIGHT VALVES

[75] Inventors: Fuad Doany, Katonah; Derek B. Dove, Mount Kisco, both of N.Y.; Rama Singh, Bethel, Conn.; Alan Rosenbluth, Yorktown Heights, N.Y.; George Chiu, Cross River, N.Y.; Thomas Cipolla, Katonah, N.Y.; Janusz Wilczynski, Ossining, N.Y.

[73] Assignee: International Business Machines Corporation, Armonk, N.Y.

[21] Appl. No.: 493,736

[22] Filed: Jun. 22, 1995

[51] Int. Cl.[6] .................. H04N 9/31; H04N 5/74
[52] U.S. Cl. .................. 348/756; 348/751; 348/757; 353/34; 353/37; 349/62
[58] Field of Search .................. 348/751, 752, 348/756, 761, 762, 766, 832–835, 779, 780, 781, 784, 785, 787; 359/40, 60, 72, 93, 629, 636; 353/122; H04N 9/31

[56] References Cited

U.S. PATENT DOCUMENTS

| 3,202,039 | 8/1965 | De Lang et al. . |
| 3,602,637 | 8/1971 | Katsuta et al. . |
| 4,097,128 | 6/1978 | Matsumoto et al. . |
| 4,687,301 | 8/1987 | Ledebuhr . |
| 4,916,529 | 4/1990 | Yamamoto et al. . |
| 4,969,730 | 11/1990 | van den Brandt ............... 353/31 |
| 4,989,953 | 2/1991 | Kirschner ............... 348/824 |
| 5,022,750 | 6/1991 | Flasck . |
| 5,096,280 | 3/1992 | Hamada . |
| 5,130,826 | 7/1992 | Takanashi et al. ............... 348/752 |
| 5,196,926 | 3/1993 | Lee . |
| 5,206,674 | 4/1993 | Puech et al. . |
| 5,251,068 | 10/1993 | Oshima et al. . |
| 5,268,775 | 12/1993 | Zeidler ............... 359/40 |
| 5,270,804 | 12/1993 | Lach . |
| 5,335,022 | 8/1994 | Braun et al. ............... 348/744 |

FOREIGN PATENT DOCUMENTS 0364043  4/1990  European Pat. Off. ......... H04N 9/31

OTHER PUBLICATIONS

Japanese Patent Abstract JP 61-177079, Aug. 8, 1986.

*Primary Examiner*—Michael Lee
*Attorney, Agent, or Firm*—Scully, Scott, Murphy & Presser

[57] ABSTRACT

An optical system is described consisting of reflection birefringent light valves, polarizing beam splitter, color image combining prisms, illumination system having a light tunnel, projection lens, filters for color and contrast control, and screen placed in a configuration offering advantages for a high resolution color display.

16 Claims, 1 Drawing Sheet

EFFICIENT OPTICAL SYSTEM FOR A HIGH RESOLUTION PROJECTION DISPLAY EMPLOYING REFLECTION LIGHT VALVES

RELATED APPLICATIONS

This application is related to U.S. application Ser. No. 08/410,428, filed Mar. 23, 1995 (docket YO994-208), U.S. application Ser. No. 08/410,429, filed Mar. 23, 1995 (docket YO994-229) and U.S. application Ser. No. 08/410,430, filed Mar. 23, 1995 (docket YO994-230), and each of which is incorporated herein by reference.

BACKGROUND OF THE INVENTION

1. Field of the Invention

The present invention is directed to optical systems for projection displays and more particularly to a high resolution improved optical system employing reflection light valves.

2. Discussion of the Prior Art

The development of liquid crystal flat panel displays has led to interest in using such panels as transmission light valves for a color projection display for data or video applications. A number of such systems are commercially available. However, in order to prepare light valves with a higher number of pixels as required for high resolution applications, the liquid crystal panel becomes large. It is difficult to produce panels with very small pixels since the electronic circuit structure needed for the operation of the panel obscures the light passage through the pixels to an intolerable degree. Instead, there is interest in light valves consisting of an array of pixels designed to operate in reflection instead of transmission. In reflection mode, it becomes possible to fabricate the mirror structure directly above the electronic circuitry. This mode allows smaller pixel areas without the obstruction of light passage caused by the circuitry, thus allowing maximum light throughput. This solves the pixel size problem, but introduces complexity into the optical system required to project an image of one or several cells onto a screen.

A major class of liquid crystal light valves operates in a birefringent mode. Liquid crystal light valves are one known type of a spatial light modulator. The operating principle is based on rotation of polarization of the incoming light for each pixel. An image is formed in a transmission liquid crystal cell when the cell is placed between two polarizers. In a reflection mode of operation, the challenge is to direct linearly polarized light onto the light valves and to form an image only using the light reflected with rotated polarization. The reflective light valve mirrors will reflect both polarizations of light. Light of the original polarization must be selectively removed from the reflected light beam and not be allowed to reach the screen.

U.S. Pat. No. 4,687,301 to Ledebuhr discloses a liquid crystal light valve projection system that includes a beam polarizer, a color separating assembly that comprises two color separators enclosed in a liquid filled enclosure, and liquid crystal reflection light valves for reflecting the separated colored light back into the separating assembly to be combined and directed into a projection lens. One of the drawbacks of this system is that portions of the source image are lost or significant portions of the illumination light are lost because of differences between the shape of the light introduced into the system and the shape of the light valves. Furthermore, typical illumination schemes usually produce non-uniform illumination on the light valves resulting in poor intensity uniformity and poor color uniformity in the projected image. Other drawbacks include a lack of polarization control and poor contrast. Additional problems include stray light reflected back from the projection lens and adverse effects of room light. Thus there is a need for an efficient optical system for achieving a full color high resolution display using several reflective birefringent light valves.

SUMMARY OF THE INVENTION

The object of this invention is to provide an efficient compact optical system for a high resolution data or video projection display, having full color and utilizing reflection-type birefringent spatial light modulators such as liquid crystal light valves that eliminates the problems of prior art systems.

An apparatus of the present invention for projecting an image comprises a color splitting prism assembly having a plurality of output-input faces, and a reflective spatial light modulator at each of said output-input faces, each of said spatial light modulators having a reflective surface defining a geometrical shape. A light tunnel is positioned with a first light path between a light source and said color splitting prism assembly, and has a cross-sectional shape corresponding to said geometrical shape. A color filter is positioned between each of said reflective surfaces and said output-input faces. A polarizing beam splitter is positioned within said first light path, and a projection lens is positioned in a second light path between the polarizing beam splitter and a screen. A means for suppressing stray light reflected from said screen back into said projection lens, and a means for suppressing ambient light from illuminating said screen, are also provided.

More particularly, the liquid crystal display (LCD) projector of the present invention comprises an illumination system having a light source such as a metal-halide arc lamp, an ultraviolet and infrared filter or filters positioned in the optical path from the light source for filtering out the infrared and ultraviolet light emitted from the light source, a light tunnel for providing uniform light intensity, and a relay lens system for magnifying the illumination system output plane and imaging said plane onto the liquid crystal light valves.

Between the relay lens system and the light valves, the LCD projector also includes a polarizing beam splitter cube for selecting one of the two polarization of the light and directing said polarization along the optical path, and an optical assembly comprised of a plurality of prisms for separating the light into a plurality of color components. In the preferred embodiment, the prism assembly is comprised of three prisms for sequentially separating the red (R), blue (B) and green (G) light components from the visible light and directing each light element onto a reflective LCD light valve. The three light valves are positioned with their reflective surfaces perpendicular to the optical path and serve to spatially modulate the light beam by means of rotation of the polarization of the light, and to reflect each of the R, G, B light elements back into the optical path such that each of the three elements will retrace its original path through the color prism assembly which serves to recombine the three R, G, B light elements into one light beam. The light beam will then reemerge from the color prism assembly, pass through the polarizing beam splitter cube which will separate the modulated light from the unmodulated light and direct the modulated light beam into the projection lens which serves to combine the images of the three light valves and project the composite image onto a rear projection screen comprising, for example, a fresnel lens and a diffusing screen. The optical path from the projection lens to the screen may also contain one or more fold mirrors to direct the light onto the screen.

A color filter is positioned at each output face of the color splitting prism assembly. The color filters absorb color not corresponding to the color of the light reflected by the spatial light modulator for color band selection, color balance and purity in order to improve efficiency of the apparatus.

The means for suppressing stray reflection from the projection lens from reaching the screen includes a quarter wave plate disposed between the polarizing beam splitter and the projection lens. The means for suppressing ambient light from the screen includes a quarter wave plate and a polarizing film placed on the screen with the plate being positioned between the screen and the film.

The light tunnel may be comprised of a set of mirrors to form a hollow tunnel or a slab of glass to form a solid light tunnel. The tunnel is positioned between the source and the relay lens system. The cross-sectional shape of the tunnel corresponds to the geometrical shape of the spacial light modulator, which results in substantially all of the image being uniformly illuminated and projected onto the screen without loss of, for example, the corners of the image. Thus, the amount of light projected onto the screen is optimized.

DETAILED DESCRIPTION OF THE INVENTION

Figure 1:
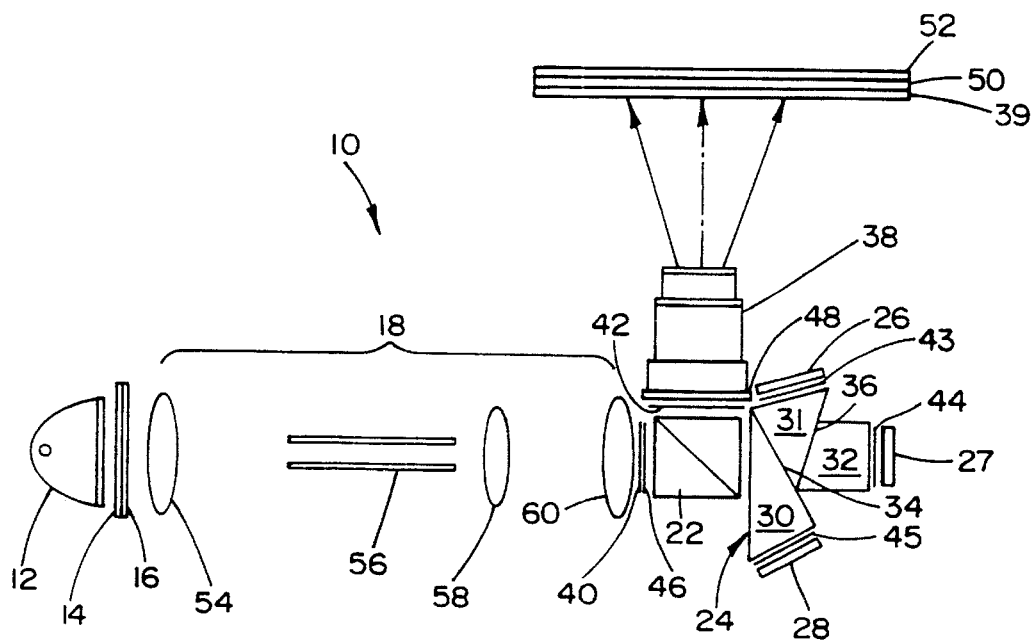
FIG. 1 is a schematic of an optical projection display system for the present invention.

Referring now to the drawings, FIG. 1 shows a schematic of the optical arrangement for an LCD projector 10 of the present invention. The projector 10 includes a lamp source 12, an infrared filter 14, an ultraviolet filter 16, and an illumination system 18 including an intensity uniformization means such as a light tunnel 56. The projector 10 also includes a polarizing beam splitter 22, a prism assembly 24 for sequentially separating the light into the desired plurality of colors, such as red, green and blue light components, and directing each of the three color components onto one of three birefringent reflective light valves 26, 27 and 28. The prism assembly 24 is comprised of three prisms 30, 31 and 32 arranged at angles to provide two color separating surfaces 34 and 36 having dichroic coatings thereon that provide the desired color separation. The prism assembly 24 serves the additional function of recombining the light reflected from the light valves. The dichroic coatings are designed to preserve performance for both polarizations. The projector 10 further includes a projection lens 38 and a screen 39 upon which the desired image is formed. The optical image forming module comprising the polarizing beam splitter cube 22, the color splitting/combining prism assembly 24 used in a double-pass mode, and the reflective light valves 26, 27, 28 form the color images that may be projected onto a screen. It should be noted that the relative position of the illumination system 18 with the light source 12 and filters 14 and 16 as shown in FIG. 1 may be exchanged with the projection lens 38 and screen system 39.

The illumination optics 18 includes a lens 54 to focus the emitted visible light into the light tunnel 56 comprised of either a set of mirrors to form a hollow tunnel or a slab of glass to form a solid light tunnel. A relay lens system shown for example by lens 58 and 60 magnifies the uniform light tunnel output plane and images the plane onto the spacial light modulators through the beam splitting cube 22 and prism assembly 24.

The light focused by lens 54 enters light tunnel 56 and is reflected many times off of the walls of the tunnel to in effect homogenize the light into a beam having a uniform intensity. In accordance with the present invention, by forming the light tunnel with a cross-sectional shape that corresponds to the geometrical shape of the light valves 26, 27 and 28, the loss of light or of intensity in the corners of the image is prevented. In a preferred embodiment, the light tunnel is comprised of four mirrors assembled to form a hollow rectangular mirror tunnel. The length of the tunnel is that which provides a minimum of two reflections for the extreme angular light rays that enter the light tunnel when focussed by lens 54. By matching the cross-sectional shape of the light valves and allowing a minimum of ±2 reflections in the tunnel, this embodiment provides a uniform intensity distribution on the entire light valve as well as very efficient utilization of all the light entering the light tunnel.

The projector system 10 also includes various additional. efficiency enhancement means. These additions include color and polarization controlling filters placed at key locations for the enhancement and control of color and contrast. These filters include a polarizing film 40 placed in the illumination path between the lamp 12 and the polarizing beam splitter cube 22 and/or a polarizing film 42 placed between the polarizing cube 22 and the projection lens 38 for additional polarization control and for contrast enhancement. Color filters 43, 44 and 45 can also be placed between the light valves and the color prism assembly 24. In addition, a color filter 46 can be placed within the illumination path between the lamp 12 and the polarizing beam splitter cube 22 for color and stray light control.

The projector system 10 further includes a quarter wave plate 48 disposed between the projection lens 38 and a source of the recombined beams, in this case the beam splitting cube 22 to remove stray light reflected back from the lens 38. A further efficiency means is provided by a screen element consisting of a quarter wave film 50 and a polarizing film 52 disposed on screen 39 to reduce the effects of room light reflection. The polarizing film 52 is placed on the viewing side of the screen 39 and the quarter wave filter 50 is placed between the film 52 and screen 39.

The function of the major components within the display system can be understood by following the path of light rays from the light source 12 through the system to the screen 39. The light source 12 is a metal-halide arc lamp with a parabolic reflector. Immediately following the lamp reflector 12 are filters 14, 16 for removing the infrared and ultraviolet radiation from the light source. The visible light is then directed into the illumination optics 18 which functions to provide uniform light intensity and to form a largely parallel beam that is to be used to bring light upon the light valves at a largely normal incidence.

The light incident upon the light valves must be linearly polarized, but light reflected having the same polarization is to be excluded from the image forming beam. Application of a voltage to the liquid crystal light valves 26, 27, 28 causes a rotation of polarization, therefore light of polarization rotated relative to the incident beam is selected for forming the image upon the screen. This is achieved by use of the polarization beam splitter cube 22 designed for use over a wide range of wavelengths of the visible light spectrum and over a suitable range of angular divergence of the beam, typically a number of degrees.

Figure 2:
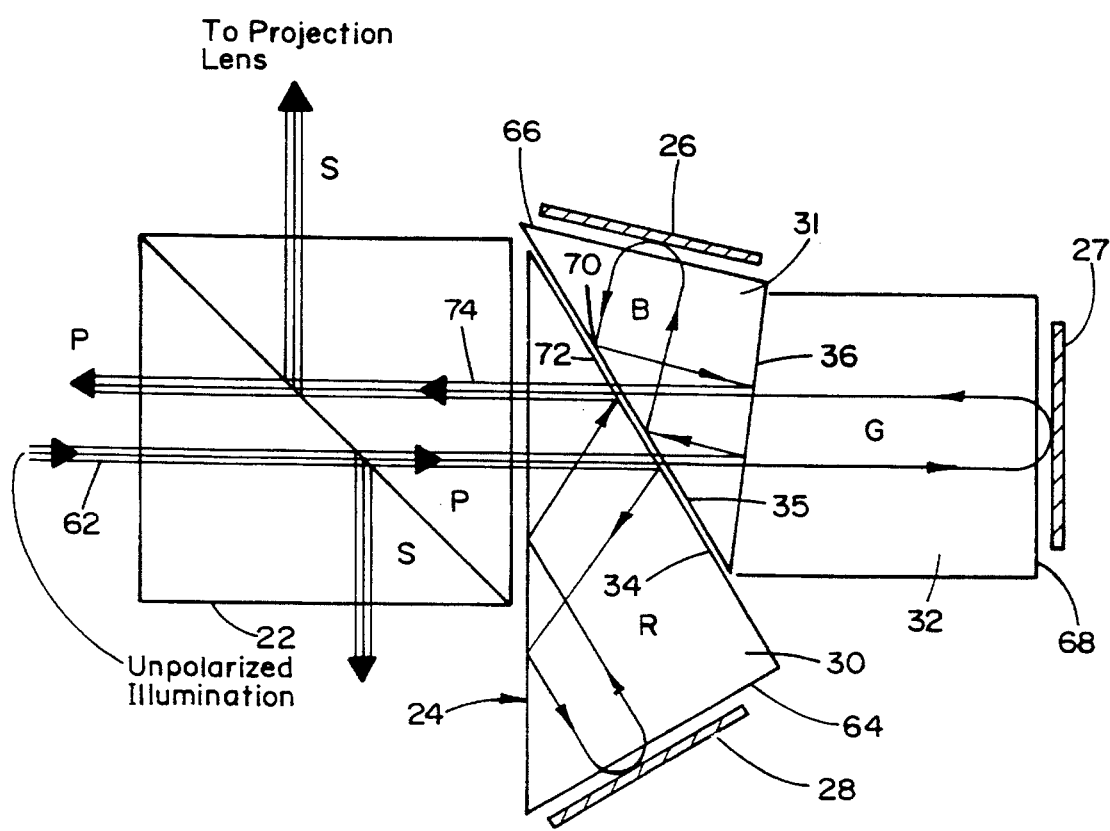
FIG. 2 is a schematic cross-sectional view of light paths through a color separating assembly of the system of FIG. 1.

The light path through the image-forming module is shown in detail in FIG. 2. Light beam 62 enters the beam splitter 22 and the so-called p polarization component propagates directly towards the light valves whereas the s component is reflected by the prism as is well known for a polarizing beam splitter. Light of p polarization from the polarizing beam splitter enters prism assembly 24 which is similar to that used to divide light into primary color bands in a video camera. This is achieved by dichroic coatings upon the prism faces as is well known for the camera application. Surface 34 reflects the red component and transmits blue and green components. Surface 36 reflects the blue component and transmits the remaining green component. The red and blue components are internally reflected by their respective prisms 30 and 31 and exit through output faces 64 and 66. The green component exits directly through output face 68. It should be noted that the sequence of separation of the R, G, B components may be changed as desired.

The individual red, green and blue color components impinge upon light valves 26, 27, 28 situated at the output faces 64, 66, 68 of the prism assembly 24. In camera applications of these color prisms, CCD detectors would be placed at the location of the light valves. In the present invention, the light is reflected back from each valve so as to traverse the prism assembly 24 a second time, so reconstituting a "white" light beam again from the R, G and B color components. The red component is again reflected from surface 34. The blue component is reflected at point 70 of surface 35 of prism 31 but is transmitted at point 72. The angle of incidence at point 70 is steeper than the so-called critical angle so that total internal reflection occurs. The blue component is transmitted at point 72 because the angle of incidence is below the critical angle. The combined R, G, B reflected beam 74 traverses the polarizing beam splitter 22, but this time the original p component is transmitted through the prism and discarded while the rotated s polarization component is reflected by the prism as desired, to the projection lens. It is to be noted that the projection lens must be of a special design to accommodate the large glass working distance and the telecentric illumination. Such a lens is described as a retrofocus telecentric lens. The projection lens forms an image of all three light valves upon a screen which may be viewed either from the front or rear. The images of the light valves are brought into coincidence upon the screen by mechanically adjustment of the light valves relative to the prism output faces.

An alternative optical arrangement is also possible in which the s polarization is used for illumination and the p polarization is used in the imaging path. This arrangement can be simply achieved by interchanging the illumination optics (including the lamp) and the projection lens (plus screen) in FIG. 1.

As stated above, the efficiency of the optical system is improved by quarter wave plate 48 incorporating a thin birefringent layer or layers placed between the projection lens 38 and the polarizing beam splitter 22 for the reduction of the possibility of light reflected back into the optical system by the surface of the lens elements being reflected back again to the screen. Light going through the quarter wave retardation plate or film system 48 toward the lens 38 and then reflected back through the film a second time will have its polarization direction rotated by 90° and thus will be removed from the optical system by the polarizing cube 22.

The optical system of the present invention is also directed to a screen element consisting of a quarter wave plate, film or set of films 50 and a polarizing film 52. These elements are placed on the screen 39 with the polarizing film 52 on the outside and the quarter wave film system 50 toward the lens 38. These screen elements serve to reduce room light reflections from the screen while transmitting essentially all the light from the projection lens. By converting the circularly polarized light from the lens back to linear polarization, all the linearly polarized light will be transmitted through the polarizing film. However, the first polarization of room light will be absorbed in the polarizing film 52 as the light enters the film. The second polarization will pass through the quarter wave film system 50, reflect off the screen and go back through the quarter wave film system 50 a second time. This double pass converts the second polarization to the first polarization which will, be absorbed by the polarizing film 52.

Several additional features are disclosed to further improve efficiency. It is preferred that all dichroic coatings be optimized for their function within the system. That is, although polarizing beam splitters and color combining prisms are known in the art, they are poorly suited to the present application unless care is taken to design for the optimization of the incident p polarization and emergent s polarized beam. The use of a lamp of small arc size matched by optical design for efficient illumination of the light valves is also preferred. In addition, the use of color filters 43, 44, 45 and 46 provide selection of the color bands, color balance and color purity for improving efficiency. Each spacial light modulator has its own filter or filters. The filters absorb band edges of each color since the color splitting/combining prism assembly 24 is not efficient at band edges, because band edges are particularly sensitive to polarized light. The filter operates in both directions, i.e., light going to the modulator and light reflected by the modulator, and absorbs light of the other two colors. Filter 46 also removes stray light in the assembly.

Pre-polarizer 40 is an absorbing film that absorbs one polarization of light and transmits the other. Film 40 pre-selects the polarization used in the optics in order to enhance their performance, as well as provide improved contrast. Post-polarizing filter or clean-up polarizer 42 is an absorbing polarizing film. Film 42 is aligned to transmit the modulated light, absorbs any residual unmodulated light, and provides enhanced performance and better contrast.

The disclosed optical system has application to desk top data monitors having compact form and very high resolution compared with CRT monitors. It also has application to conference room displays, for video and for HDTV usage. It may be implemented as either a front or rear screen projection display.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. An apparatus for projecting an image comprising:

a color splitting prism assembly having a plurality of output-input faces;

a reflective spatial light modulator at each of said output-input faces, each of said spatial light modulators having a reflective surface defining a geometrical shape;

a light tunnel positioned within a first light path between a light source and said color splitting prism assembly, said light tunnel having a cross-sectional shape corresponding to said geometrical shape;

a color filter positioned between each of said reflective surfaces and said output-input faces;

a polarizing beam splitter positioned within said first light path;

a projection lens positioned in a second light path between said polarizing beam splitter and a screen;

means for suppressing stray light reflected from said screen back into said projection lens; and means for suppressing ambient light from illuminating said screen.

2. The apparatus of claim 1 wherein said reflective spatial light modulator includes a liquid crystal light valve assembly.

3. The apparatus of claim 1 wherein said color splitting prism assembly is comprised of three solid glass prisms forming two color separating surfaces located internally of said assembly.

4. The apparatus of claim 1 wherein said polarizing beam splitter is comprised of two solid glass prisms forming a polarization separating surface internally of said beam splitting means.

5. The apparatus of claim 1 further including means for filtering out ultraviolet and infrared light positioned within said first light path.

6. The apparatus according to claim 1 further including a pre-polarizing filter positioned within said first light path between the light source and said polarizing beam splitting means.

7. The apparatus according to claim 1 further including a post-polarizing filter positioned within said second light path between said polarizing beam splitting means and said projection lens.

8. The apparatus according to claim 6 further including a post-polarizing filter positioned within said second light path between said polarizing beam splitting means and said projection lens.

9. The apparatus according to claim 1 further including a color absorbing film disposed within said first light path between said light source and said polarizing beam splitter.

10. The apparatus of claim 1 wherein said light tunnel is comprised of a plurality of mirrors.

11. The apparatus of claim 10 wherein said light tunnel is comprised of four mirrors assembled to form a hollow rectangular tunnel.

12. The apparatus of claim 1 wherein said light tunnel is comprised of solid glass.

13. The apparatus of claim 1 further including a plurality of lenses positioned within said first light path.

14. The apparatus according to claim 1 wherein said means for suppressing stray light reflected from said screen includes a quarter wave plate positioned within said second light path.

15. The apparatus of claim 1 wherein said means for suppressing ambient light includes a quarter wave plate and a polarizing film placed on said screen, said polarizing film being positioned on the viewing side of said screen and said quarter wave plate being positioned between said polarizing film and said screen.

16. The apparatus of claim 1 wherein said means for suppressing ambient light includes at least one quarter wave film and a polarizing film placed on said screen, said polarizing film being positioned on the viewing side of said screen and said at least one quarter wave film being positioned between said polarizing film and said screen.

* * * * *